US010866396B2

(12) United States Patent
Fahrbach et al.

(10) Patent No.: US 10,866,396 B2
(45) Date of Patent: Dec. 15, 2020

(54) ILLUMINATION ARRANGEMENT FOR A LIGHT SHEET MICROSCOPE

(71) Applicant: Leica Microsystems CMS GmbH, Wetzlar (DE)

(72) Inventors: Florian Fahrbach, Heidelberg (DE); Werner Knebel, Kronau (DE); Joachim Bradl, Viernheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 255 days.

(21) Appl. No.: 15/754,296

(22) PCT Filed: Aug. 24, 2016

(86) PCT No.: PCT/EP2016/069988
§ 371 (c)(1),
(2) Date: Feb. 22, 2018

(87) PCT Pub. No.: WO2017/032805
PCT Pub. Date: Mar. 2, 2017

(65) Prior Publication Data
US 2018/0252906 A1    Sep. 6, 2018

(30) Foreign Application Priority Data

Aug. 24, 2015  (DE) .......................... 10 2015 114 037
Aug. 27, 2015  (LU) .......................................... 92807

(51) Int. Cl.
*G02B 21/00*    (2006.01)
*G02B 21/06*    (2006.01)
(Continued)

(52) U.S. Cl.
CPC ..... *G02B 21/0032* (2013.01); *G01N 21/6458* (2013.01); *G02B 21/0036* (2013.01);
(Continued)

(58) Field of Classification Search
None
See application file for complete search history.

(56) References Cited

U.S. PATENT DOCUMENTS 9,823,457 B2 * 11/2017 Li .......................... G02B 21/18
2006/0033987 A1   2/2006 Stelzer et al.
(Continued)

FOREIGN PATENT DOCUMENTS

DE         10257423 A1     6/2004
DE     102007015063 A1    10/2008
(Continued)

OTHER PUBLICATIONS

Joerg G Ritter et al: "A cylindrical zoom lens unit for adjustable optical sectioning in light sheet microscopy references and links", Biomedical Optics Express 185, vol. 170, No. 347, Jan. 1, 2012 (Jan. 1, 2012), pp. 211-219, XP055137860.
(Continued)

*Primary Examiner* — Derek S. Chapel
(74) *Attorney, Agent, or Firm* — Leydig, Voit & Mayer, Ltd.

(57) ABSTRACT

An illumination arrangement for a light sheet microscope, in which a sample is illuminated using an illumination light beam that is formed as a light sheet in a region of the sample, includes an illumination objective, a tube lens and astigmatic optics. The astigmatic optics are designed in such a way and arranged between the tube lens and the illumination objective in such a way that the illumination light beam exiting from the illumination objective is focused both in a sagittal plane and in a meridional plane.

22 Claims, 10 Drawing Sheets

(51) Int. Cl.
   *G01N 21/64* (2006.01)
   *G02B 21/16* (2006.01)
(52) U.S. Cl.
   CPC ......... *G02B 21/0076* (2013.01); *G02B 21/06* (2013.01); *G02B 21/16* (2013.01)

(56) References Cited

U.S. PATENT DOCUMENTS

| | | |
|---|---|---|
| 2009/0237765 A1 | 9/2009 | Lippert et al. |
| 2016/0048012 A1 | 2/2016 | Knebel et al. |
| 2016/0306154 A1* | 10/2016 | Iguchi .................... G02B 21/06 |

FOREIGN PATENT DOCUMENTS

| | | |
|---|---|---|
| DE | 102010013223 A1 | 9/2011 |
| DE | 102013213781 A1 | 9/2014 |

OTHER PUBLICATIONS

Huisken J et al: "Even fluorescence excitation by multidirectional selective plane illumination microscopy (MSPIM)", Optics Letters. Optical Society of America, vol. 32, No. 17, Sep. 1, 2007 (Sep. 1, 2007), pp. 2608-2610, XP001507615.

Jan Wolfgang Krieger, "Mapping Diffusion Properties in Living Cells", Dissertation, Jul. 23, 2014, pp. 1-277.

Jan Huisken, et al., "Optical Sectioning Deep Inside Live Embryos by Selective Plane Illumination Microscopy", Science, vol. 305, Aug. 13, 2004, pp. 1007-1009.

* cited by examiner

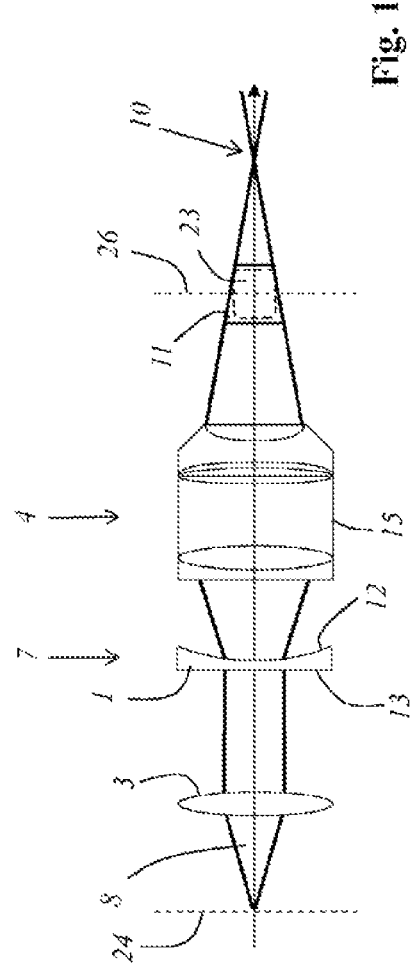
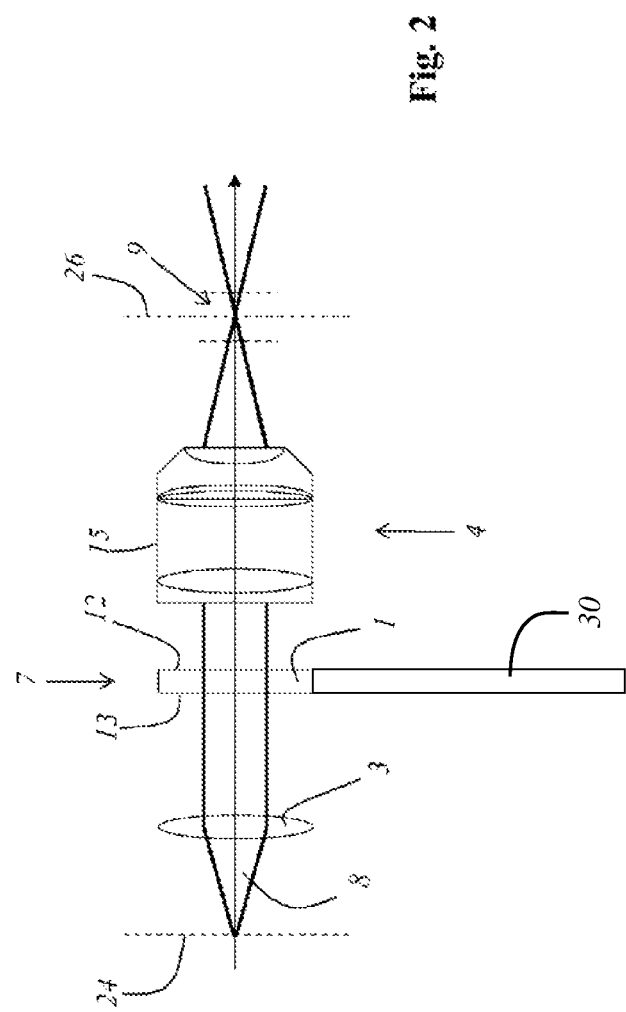

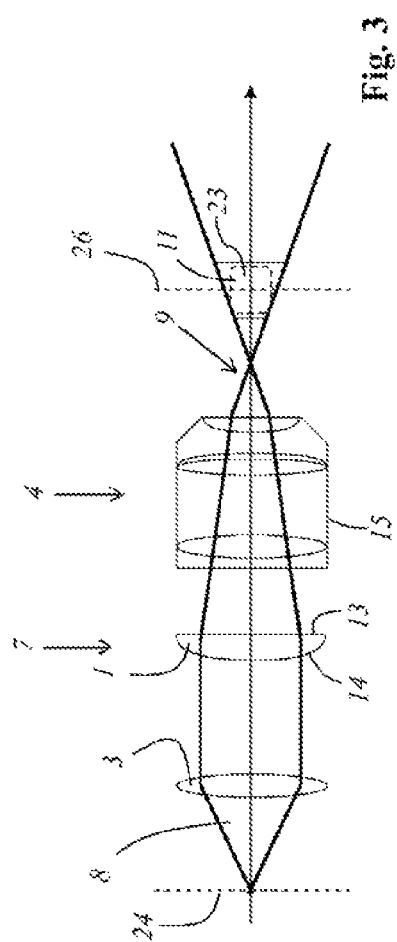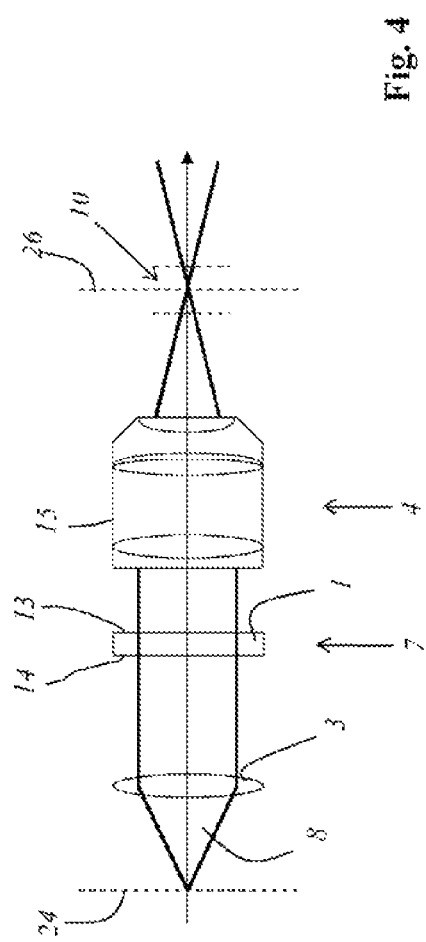

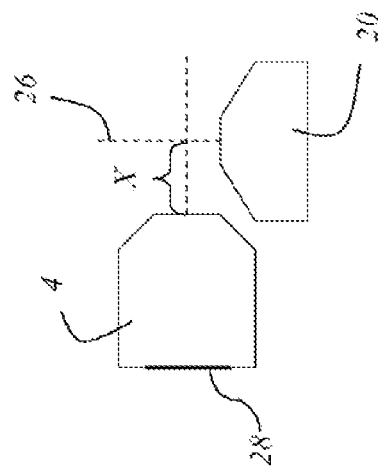
Prior Art
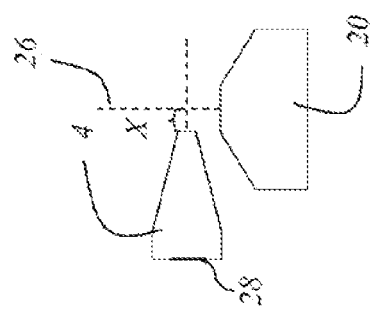
Fig. 9

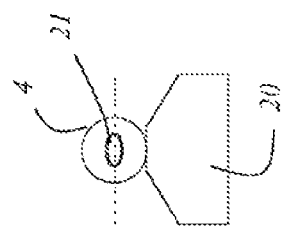
Fig. 10
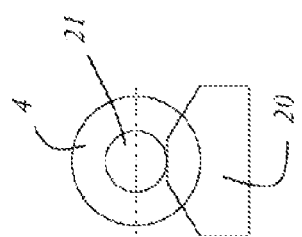
Prior Art

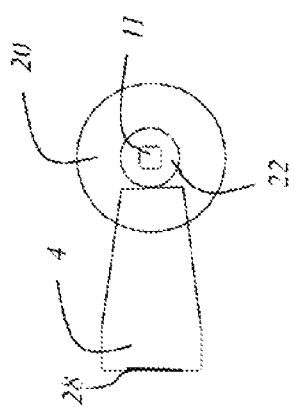
Fig. 11
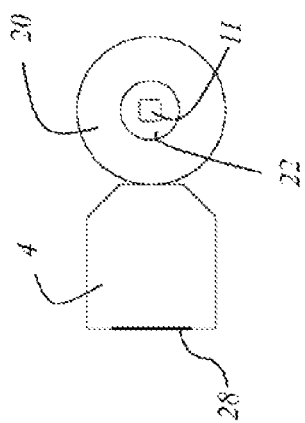
Prior Art

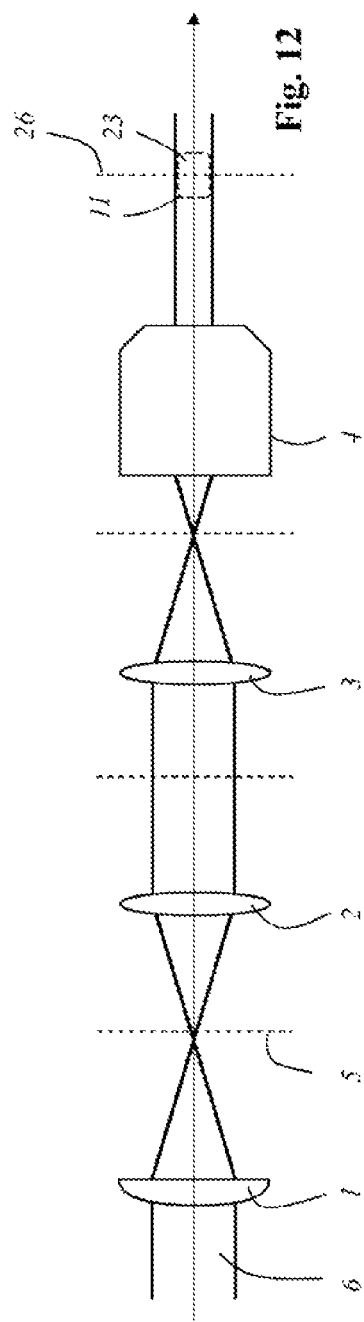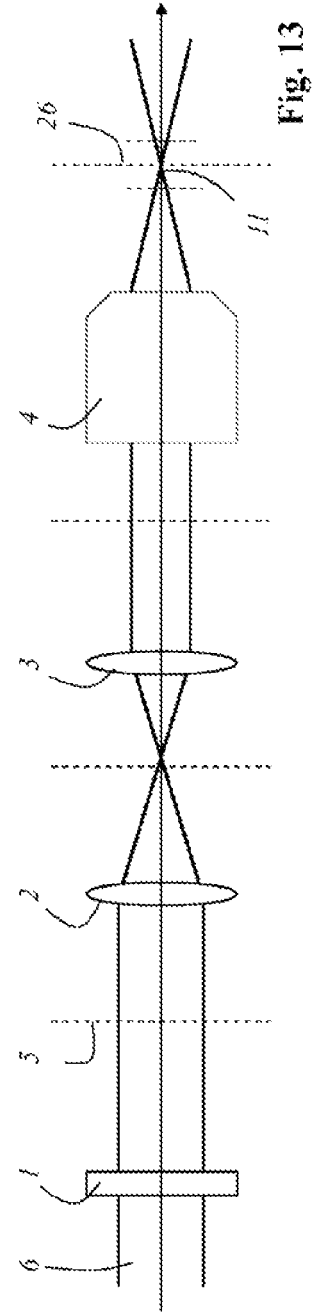
Prior Art

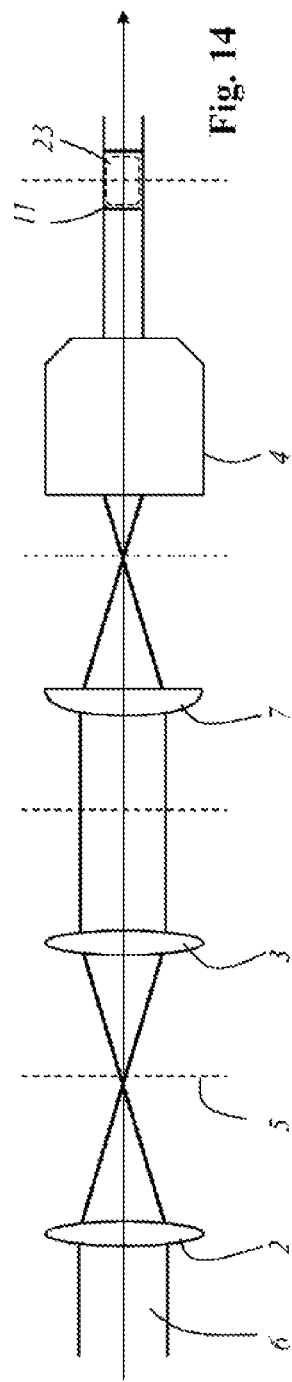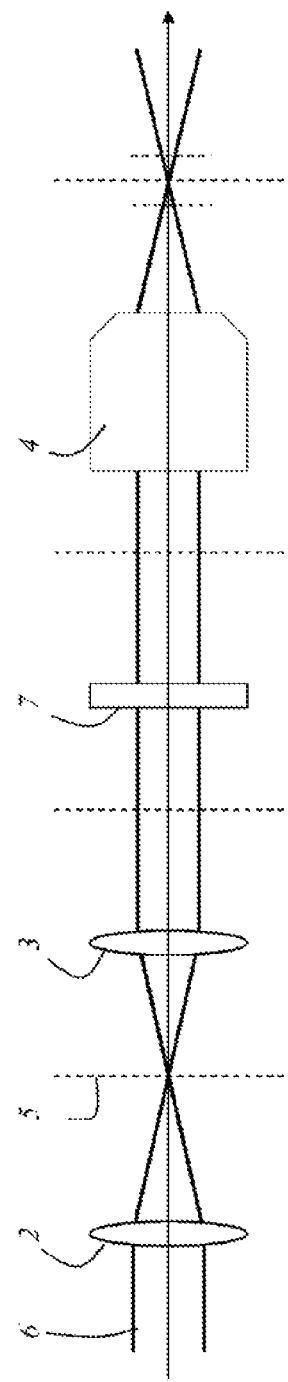

ILLUMINATION ARRANGEMENT FOR A LIGHT SHEET MICROSCOPE

CROSS-REFERENCE TO PRIOR APPLICATIONS

This application is a U.S. National Stage Application under 35 U.S.C. § 371 of International Application No. PCT/EP2016/069988 filed on Aug. 24, 2016, and claims benefit to German Patent Application No. DE 10 2015 114 037.3 filed on Aug. 24, 2015, and Luxembourgian Patent Application No. 92807 filed on Aug. 27, 2015. The International Application was published in German on Mar. 2, 2017, as WO 2017/032805 A1 under PCT Article 21(2).

FIELD

The invention relates to an illumination arrangement for a light sheet microscope, in which a sample is illuminated using an illumination light beam, which is formed as a light sheet in the region of the sample, comprising an illumination objective, a tube lens and astigmatic optics.

The invention additionally relates to a method for illuminating a sample, in particular with use of an illumination arrangement of this kind.

The invention furthermore relates to a microscope which contains an illumination arrangement of this kind and to a method for examining a sample by means of a microscope of this kind.

BACKGROUND

The SPIM (single plane illumination microscopy) technique, in which a sample is illuminated in layers, allows a quicker detection, which is also gentler on the sample, of image data compared to a scanning of a sample at specific points, for example. A known field of use of SPIM technology is the field of fluorescence microscopy, wherein fluorophores are excited in the sample by means of laser light. In the case of SPIM technology, an excitation takes place here only in one object region illuminated by an illumination light sheet (also referred to as a "light strip"). Damage to the sample caused by illumination light in other planes is thereby avoided. One or more two-dimensional images is/are usually recorded in a direction perpendicular thereto.

An optical device that functions in accordance with the SPIM method is described in DE 102 57 423 A1. In the case of this microscope, a sample is illuminated with a thin light sheet, whilst being observed from a direction perpendicular to the plane of the illuminating light sheet. Here, the illumination and the detection take place over two separate optical beam paths each with a separate optics. The light sheet is produced by a cylinder lens. To record the image(s) the sample is moved through the light sheet, which is fixed relative to the detector, so as to record fluorescent light and/or scattered light layer by layer using a planar detector. The layer image data thus obtained can then be collated to form a corresponding dataset from a three-dimensional imaging of the sample.

Production of a light sheet exclusively using a cylinder lens has the disadvantage that, with routinely available lenses, the optical quality of the light sheet is not sufficiently high to produce a diffraction-limited light sheet over a broad spatial and spectral range. Even with achromatic cylinder lenses it is not possible to produce a diffraction-limited light sheet having a thickness of a few μm.

DE 10 2007 015 063 A1 discloses an optical arrangement comprising a light source for emitting a light beam and comprising optical elements for converting this light beam into the form of a light sheet. The optical arrangement is suitable in particular for illuminating individual planes of a three-dimensional sample in selective plane illumination microscopy (SPIM). Means for varying the cross section of the light sheet, for varying the length of the light sheet and/or for influencing the direction of the beam components running within the light sheet are provided in order to adapt the geometry of the light sheet to the illumination requirements for observing one and the same sample plane with a plurality of different objectives.

Another arrangement for producing a light sheet is known from the dissertation by W. Krieger, "Mapping Diffusion Properties in Living Cells", Heidelberg, 2014. In this arrangement, a cylinder lens is arranged precisely at the distance of its focal length in front of the pupil of the illumination objective. The width of the light sheet is no longer a free parameter due to the dependency of the width of the light sheet on the focal length of the cylinder lens mounted in the predefined position, and this is disadvantageous. If the focal length of the cylinder lens is selected such that it corresponds to the distance of the position of the cylinder lens from the pupil of the illumination objective, the width of the light sheet $w_{LS}$ is thus already defined by $w_{LS}=M \cdot w_{CL}$, wherein $w_{CL}$ is the width of the collimated illumination light beam at the position CL and $M=f_{BO}/f_{CL}$, that is to say the quotient of the focal lengths of the cylinder lens and the illumination objective. Since $w_{CL}$ and $f_{BO}/f_{CL}$ are usually predefined, there is no longer a free parameter for varying the width of the light sheet $w_{LS}$.

SUMMARY

In an embodiment, the present invention provides an illumination arrangement for a light sheet microscope, in which a sample is illuminated using an illumination light beam that is formed as a light sheet in a region of the sample. The illumination arrangement includes an illumination objective, a tube lens and astigmatic optics. The astigmatic optics are designed in such a way and arranged between the tube lens and the illumination objective in such a way that the illumination light beam exiting from the illumination objective is focused both in a sagittal plane and in a meridional plane.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 shows a first embodiment of an illumination arrangement according to the invention in a view perpendicular to the light sheet plane, FIG. 2 shows the first embodiment in a view parallel to the light sheet plane, FIG. 3 shows a second embodiment of an illumination arrangement according to the invention in a view perpendicular to the light sheet plane, FIG. 4 shows the second embodiment in a view parallel to the light sheet plane, FIG. 9 shows an embodiment of an illumination objective according to the invention in comparison to a conventional illumination objective in a side view, FIG. 10 shows the embodiment of an illumination objective according to the invention in comparison to a conventional illumination objective in a view from the front in the direction of the optical axis of the illumination objective, FIG. 11 shows the embodiment of an illumination objective according to the invention in comparison to a conventional illumination objective in a view perpendicular to the field of view, FIG. 12 shows an embodiment according to the prior art in a view perpendicular to the light sheet plane, FIG. 13 shows the embodiment according to the prior art in a view parallel to the light sheet plane, FIG. 14 shows another embodiment according to the prior art in a view perpendicular to the light sheet plane, and FIG. 15 shows the other embodiment according to the prior art in a view parallel to the light sheet plane.

DETAILED DESCRIPTION

Figure 5:
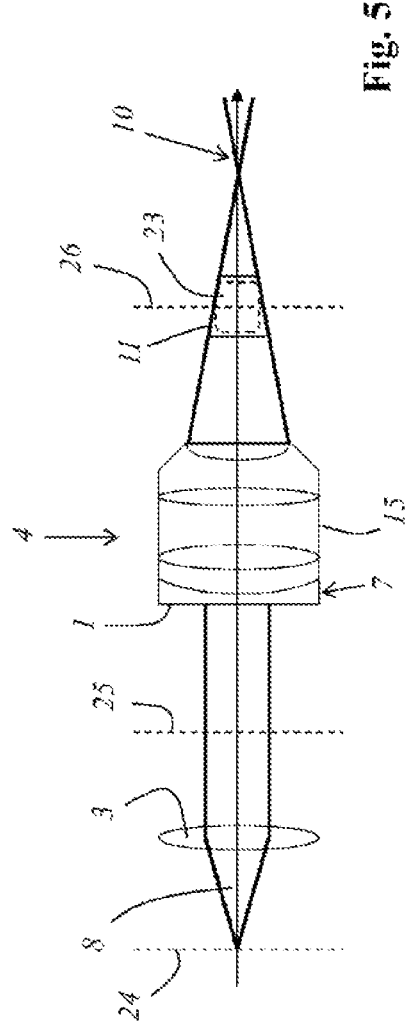
FIG. 5 shows a third embodiment of an illumination arrangement according to the invention in a view perpendicular to the light sheet plane.

In an embodiment, the present invention provides an illumination arrangement that can be formed in a compact manner and that enables the flexible production of a diffraction-limited light sheet.

According to an embodiment, an illumination arrangement of the type mentioned at the outset is characterized in that the astigmatic optics is designed in such a way and arranged between the tube lens and the illumination objective in such a way that the illumination light beam exiting from the illumination objective is focused both in a sagittal plane and in a meridional plane.

Another embodiment of the present invention provides a method for illuminating a microscopic sample using a light sheet, which method can be adapted in a versatile manner to the respective requirements According to an embodiment, the method is characterized in that an astigmatic optics is arranged at any point between a tube lens and an illumination objective, in such a way that the illumination light beam focused by the illumination objective has a sagittal focus and a meridional focus, which each have a different axial distance from the illumination objective.

The illumination arrangement according to embodiments of the invention, which will be explained in greater detail below, has the advantage of an extremely compact construction, which makes it possible to use standard microscope bodies in the event that a microscope is provided. In addition, according to an independent advantage of embodiments of the invention, it is especially advantageous to be able to produce illumination objectives such that they can also be used together with detection objectives having a high numerical aperture, in a right-angled arrangement.

In accordance with an embodiment of the invention, it has been found in particular that the prior approaches for producing a light sheet, inter alia, are not very versatile because a light sheet that is focused in a plane along the propagation direction is always produced, and that said light sheet is collimated in the plane perpendicular thereto, i.e. does not have a focus. In consideration of this fact, on the basis of the geometrical optics, this means that a focus is present in one plane, whereas no focus is provided in the perpendicular plane, this being shown in FIGS. 12 to 15. Of course, an ideally collimated light beam exists only in the geometric optics and not in reality. The deviation between geometric optics and Gaussian optics in relation to the size of the light sheet is actually irrelevant for the present approach. Within the meaning of this document, a light sheet is understood in particular to mean the part of a light distribution which is formed by the illumination light beam on the side of the object plane of the illumination objective in a portion along the illumination axis and which has an extent of the light distribution or of the light beam perpendicular to the optical axis of the illumination objective that is smaller than a predefinable factor based on the thinnest point of the light distribution, wherein the predefinable factor is typically the square root of 2. The light sheet can be substantially rectangular—as is shown for example in FIG. 14—or preferably can be trapezoidal, as shown for example in FIG. 1, 3, 5, 7 or 8.

In a particularly advantageous embodiment, the distance of the astigmatic optics and the focal length thereof is selected such that the focus of the illumination light beam focused by the astigmatic optics does not lie within the illumination objective, since this could lead at high intensities to the destruction of the illumination objective, in particular if the focus lies at boundary layers within the objective. In addition, the optical quality for an imaging of this kind is very poor, and various errors can occur, for example color errors.

In addition, the distance of the astigmatic optics and the focal length thereof is preferably selected such that the focus does not lie far in front of the illumination objective, because otherwise the divergent beam bundle would enter the objective, which can lead to disruptive reflections at inner apertures in the illumination objective and/or to vignetting effects.

An embodiment in which the focal length of the astigmatic optics is different from the distance of the astigmatic optics from the pupil of the illumination objective can be used in a particularly versatile manner.

In an embodiment that is of particularly simple construction and yet is very versatile, no further focusing or defocusing elements are arranged between the astigmatic optics and the illumination objective. Alternatively or additionally, the astigmatic optics could be arranged rotatably about an axis—at least through a predefinable angular range—and in particular could be moved manually or in a motor-driven manner. The rotation axis here could be the optical axis of the optical beam path of the illumination device or could be offset parallel thereto. The orientation of the light sheet can be influenced hereby, wherein for example an illuminated sample area can be oriented or superimposed relative to the object plane of the detection objective.

In a particularly compact and robust embodiment, the astigmatic optics is part of the illumination objective, which is explained in greater detail below.

In accordance with an embodiment of the invention, it has also been found that the use of a conventional microscope objective in combination with a cylinder lens in the illumination arrangements known from the prior art has the disadvantage of a relatively long optical path due to the 4f arrangement usually used. In these illumination arrangements, the 4f arrangement is necessary in order to adapt the dimensions of the light sheet to the size of the field of view, which is shown in FIGS. 12 and 13. This is regardless of the fact that in the case of the illumination arrangements known from the prior art a focus is provided merely in one plane, whereas the focus is infinite in the plane perpendicular thereto.

Specifically, FIGS. 12 and 13 schematically show a construction as is known for example from Huisken, J., Swoger, J., Del Bene, F., Wittbrodt, J. & Stelzer, E. H. K., "Optical sectioning deep inside live embryos by selective plane illumination microscopy", Science 305, 1007 (2004), in FIG. 12 in a view perpendicular to the light sheet plane and in FIG. 13 in a view parallel to the light sheet plane. A construction of this kind contains a cylinder lens 1, a relay lens 2, a tube lens 3, and an illumination objective 4, wherein a widened light beam 6, which is round in cross section, is focused via a 4f imaging system through the cylinder lens 1 into a conjugate plane 5 of the entry pupil of the illumination objective 4. Here, very short focal lengths are necessary in order to illuminate large fields of view, i.e. for example in order to produce a light sheet 11 that is 1 mm wide and has a focal length of 1 mm. The field of view 23 of the detection optics preferably lies within the light sheet 11.

This is because the width $w_x$ of the light sheet can be derived from the diameter $w_0$ of the light beam emitted by the light source via the formula $w_x=(f_{obj}/f_{tub})(f_{relay}/f_{cyl})w_0$. In order to ensure good illumination, $w_{BFP}=(f_{tub}/f_{relay})w_0$ of the entry pupil of the illumination object, the following condition must be satisfied: $f_{tub} \gg f_{relay}$. This results in the requirement $f_{obj} \gg f_{cyl}$ in order to achieve a sufficient width $w_x$ of the light sheet. Furthermore, there can be cases in which the width $w_x$ is to be many times greater than the focal length, for example when the light sheet is slid along the illumination axis in order to successively scan a large sample plane. In this case as well, short focal lengths of the cylinder lens are necessary.

Similarly, the arrangement known from W. Krieger, "Mapping Diffusion Properties in Living Cells", Heidelberg, 2014 also has these disadvantages, as FIGS. 14 and 15 show.

A further limitation of the arrangements known from the prior art concerns the size and polar symmetry of the objectives usually used. This symmetry is in contrast to the very asymmetric dimensions of the light sheet, which is formed in a very elliptical manner in cross section. If the propagation properties of Gaussian beams are used to form the basis for a rough estimation in paraxial approximation, a light sheet having a width of 300 µm and a thickness of 5 µm (focal length approximately 300 µm) only reaches a round profile at a distance of 9.5 mm from the focus (at a greater distance the aspect ratio of the beam is then the reverse of the orientation of the light sheet). This means that, for objectives with a shorter working distance, a round embodiment of the front lens is not advantageous, since a significant part of the lens is not used. This aspect is particularly significant if the illumination objective is mounted at a right angle to the detection optics for an SPIM examination. Since the detection objective ideally has a high numerical aperture, there is "steric hindrance" of the two objectives when the working distance of the illumination objective is not greater than the radius of the detection objective. The two objectives then together have an excessively large spatial angle in that they can be mounted at an angle of 90 degrees to one another, such that their optical axes intersect in the focal planes. Illumination objectives with a large working distance, however, should indeed be avoided, since the necessary diameter of the lenses naturally increases with the working distance for a predefined numerical aperture and larger lenses are more complicated to produce, are heavier, and are more costly.

The particular arrangement of the astigmatic optics in the vicinity of the entry pupil of the illumination objective in such a way that the astigmatic optics is positioned between the tube lens and the illumination objective and/or no further focusing or defocusing elements are provided between the astigmatic optics and the illumination objective allows the production of a light sheet that is divergent or convergent along the propagation direction in the plane of the light sheet, which ultimately allows the dimensioning of the light sheet, i.e. the adaptation of the width of the light sheet for a given diameter of the illumination light beam to the position of the astigmatic optics.

An astigmatic optics arranged in this way has effects on or changes the refractive power of the illumination objective along the axis in which the light sheet is to be produced, approximately in accordance with the formula $1/f_{ges}=1/f_1+1/f_2-d/(f_1*f_2)$, the focal length and optical imaging quality of the illumination objective remaining unchanged along the perpendicular axis. In this way, an astigmatism is produced, wherein the illumination light beam focused by the illumination objective has a sagittal and a meridional focus, which each have a different distance from the illumination objective. In the field of view the beam cross section of the astigmatic illumination light beam is therefore elliptical. The long axis of the elliptical beam profile, in the case of an SPIM examination of a sample, is preferably arranged in such a way that it lies in the focal plane of the detection objective. Along the illumination axis, the shorter half-axis has a minimum in the focal plane of the illumination optics, and the longer half-axis monotonously increases (positive refractive power of the astigmatic optics or of a cylinder lens) or decreases (negative refractive power of the astigmatic optics or of a cylinder lens) in the region of the field of view.

In a particularly advantageous embodiment, the astigmatic optics has a negative refractive power. In particular, the astigmatic optics can advantageously have a refractive power in the range of from $-1/(500$ mm$)$ to $-1/(700$ mm$)$, in particular of $-1/(600$ mm$)$. This is the case in particular when the illumination objective has a focal length in the range of from 35 mm to 45 mm, in particular of 40 mm.

In particular, it can be provided advantageously that the astigmatic optics has a refractive power that is small in relation to the refractive power of the illumination objective—in particular less than 1/10 of the refractive power of the illumination objective. On the one hand, an embodiment of this kind is very light-efficient, since there is no significant increase in the overlighting of the entry pupil of the illumination objective. In addition, it has been found that an embodiment of this kind has the particular advantage of a good optical imaging without disruptive aberrations.

The use of an astigmatic optics having negative refractive power in particular advantageously has the result that the refractive power of the optical system consisting of the astigmatic optics and the illumination objective for the sagittal plane (or the meridional plane) has a reduced refractive power, such that the illumination light beam, once it has passed through the illumination objective, runs in a less divergent manner in relation to the sagittal plane (or the meridional plane). Nevertheless, it is quite possible to move a light sheet produced in this way relative to the sample, for example with use of a beam deflection device (or a plurality of such devices) that is adjustable in respect of the deflection angle, for example in order to scan larger sample areas in succession or in order to illuminate different regions of interest (ROIs) in successive alternation. However, it is also quite possible that the astigmatic optics has a positive refractive power, wherein what has been said above with regard to the negative refractive power applies accordingly for the positive refractive power.

The astigmatic optics can be formed in particular as a cylinder lens or can comprise at least one cylinder lens. The illumination arrangement according to the invention can be formed advantageously in particular in such a way that the astigmatic optics comprises precisely one single cylinder lens. Alternatively, it is also possible that the astigmatic optics is formed as a lens group formed of a plurality of lenses arranged one directly after the other and/or arranged in contact with one another, at least one of which lenses is formed as a cylinder lens.

In particular, the astigmatic optics can be formed as a cylinder lens having at least one concavely curved surface or can comprise at least one cylinder lens of this kind. This is desired in particular when the astigmatic optics has a negative refractive power.

In particular in the case that the astigmatic optics has a positive refractive power, the astigmatic optics can be formed as a cylinder lens having at least one convexly curved surface or can comprise at least one cylinder lens of this kind.

In particular in an embodiment of the illumination arrangement that comprises an astigmatic optics having positive refractive power, it can be provided advantageously that the illumination light beam focused by the illumination objective has a sagittal and a meridional focus, which each have a different axial distance from the illumination objective, wherein the sample is positioned in the region of the focus having the greater axial distance from the illumination objective. Here, the fact that the illumination light beam runs in a less divergent manner in relation to the plane in which the field of view lies is utilized advantageously. In other words: the refractive power of the illumination objective in a plane is not changed by the astigmatic optics. It is favorable to position the sample there because that is where the quality of the illumination light beam is particularly high, whereas the focus in the other plane perpendicular to the first plane comes closer to the illumination objective.

However, the use of an astigmatic optics having negative refractive power should not be ruled out, wherein here the sample is preferably positioned in the region of the focus having the shorter axial distance from the illumination objective. This is because the quality of the illumination light beam in the focal region which is attributed exclusively to the illumination objective is greater than in the focal region which is produced jointly by the astigmatic optics and the illumination objective.

As already mentioned, the astigmatic optics can be arranged advantageously in the pupil plane of the illumination objective or a plane conjugate therewith.

In a particularly advantageous embodiment, the astigmatic optics is arranged in an infinite beam path between the tube lens and the illumination objective. An embodiment of this kind has the particular advantage that, in the case of standard microscope bodies and conventional microscopes, a changing device is already provided anyway at this point in order to be able to introduce optical components, such as filters, beam splitters or DIC prisms (differential interference contrast prisms), which can be used. The changing device for example can be formed as a filter wheel or as a filter insert device or as a polarizing filter insert or as a turret or as a DIC turret.

Regardless of whether the astigmatic optics is positioned in the illumination beam path with use of a changing device or in some other way, it is advantageous if a device for determining the position and orientation of the optical axis of the astigmatic optics is provided so as to be able to correctly adjust the astigmatic optics, in particular using an adjustment device for adjusting the position and/or orientation of the astigmatic optics. The device for determining the position and the adjustment device can be used advantageously in particular to adjust the tilting of the light sheet relative to the focal plane of the detection objective.

As already mentioned, the astigmatic optics, alternatively to an arrangement between the tube lens and the illumination objective, can also be part of the illumination objective. This can be implemented for example in such a way that the astigmatic optics is formed as an attachment for securing to the illumination objective, in particular to an illumination objective housing. The attachment can have a thread for example, such that it can be screwed onto a mating thread of the illumination objective housing, wherein the astigmatic optics is preferably arranged on the light entry side of the illumination objective. An embodiment of this kind has the particular advantage that an objective that has not been produced specifically for SPIM illumination can be retrofitted later.

It is also possible to rigidly mount the astigmatic optics in the illumination objective in particular without this optics being able to be released from the other components of the illumination objective in a destruction-free manner. In particular, an illumination objective of this kind can be produced specifically and exclusively as an SPIM illumination objective; this is also in particular advantageous in such a way that the illumination objective tapers from an entry aperture, which is circular in cross section perpendicular to the optical axis, towards a front lens, which is elliptical in cross section perpendicular to the optical axis, so as to leave as much space as possible for the positioning of a detection objective perpendicularly to the illumination objective.

Part of the illumination objective is preferably rotatable relative to the rest of the illumination objective—at least by a predefinable or angular range—wherein the rotatable part of the illumination objective comprises the elliptical front lens. This could be implemented by means of a mechanism which is designed similarly to that provided in correction rings of microscope objectives in order to adjust thickness variations of cover glasses.

As already mentioned, the illumination arrangement according to the invention has the particular advantage of a compact construction, which allows an SPIM examination of a sample using standard microscope bodies and/or microscopes retrofitted in accordance with the invention. In particular, the invention makes it possible to produce a microscope that contains the illumination arrangement according to the invention on the basis of an existing scanning microscope. In particular, a scanning microscope of this kind can also be formed as a confocal scanning microscope. Here, it can be provided in particular that an existing scanning microscope is retrofitted with the described illumination arrangement so as to be able to use the scanning microscope as an SPIM microscope. Here, the invention has the particular advantage that there is no need for any additional installation space, and rather the installation space provided anyway in the case of a scanning microscope of this kind is sufficient to implement the above-described illumination arrangement. This is not just the case for scanning microscopes, but in particular is also applicable for upright or inverse reflected-light microscopes.

With use of a conventional fluorescence far-field microscope as a basis, the astigmatic optics can be positioned advantageously at the point at which the main beam splitter is otherwise arranged in the case of the fluorescence far-field microscope. The main beam splitter in the case of a fluorescence far-field microscope is the component that steers the illumination light coming from a light source into a portion where the illumination beam path and the detection beam path run coaxially to one another and allows the detection light coming from the sample to pass to a detector arrangement.

As already mentioned, the illumination objective in accordance with an independent concept of the invention can be formed advantageously in such a way that it tapers from an entry aperture, which is circular in cross section perpendicular to the optical axis, towards a front lens, which is elliptical in cross section perpendicular to the optical axis, wherein the illumination objective is preferably oriented in such a way that the vertical axis of the elliptical front lens is arranged in the plane of the light sheet. The special form of the illumination objective makes it possible to use the illumination objective in combination with detection optics having a high numerical aperture, even when the illumination objective has a short working distance, in particular a working distance that is shorter than the radius of the detection objective. An objective having a short working distance can be constructed with comparatively small lenses, measured on the basis of the size of the field of view and the numerical aperture.

Generally speaking, an illumination objective of this kind has the particular advantage that it can be used in particular together with detection objectives having a high numerical aperture, without the objectives colliding in space. Rather, an illumination objective of this kind allows sufficient installation space for the arrangement also of detection objectives having a high numerical aperture, which have a short working distance and therefore have to be arranged relatively closely to the light sheet.

For clarification, it should be noted that within the meaning of this application the term 'objective', in particular 'illumination objective' or 'detection objective', is understood in particular to mean an imaging optical unit containing at least three lenses and corrected achromatically or apochromatically or with regard to a planar field of view or with regard to a color magnification error.

FIG. 1 shows a first embodiment of an illumination arrangement according to the invention in a view perpendicular to the light sheet plane (light sheet plane=drawing plane). The illumination arrangement comprises an illumination objective 4, a tube lens 3, and an astigmatic optics 7, which contain a cylinder lens 1. The astigmatic optics 7 is arranged between the tube lens 3 and the illumination light 4, wherein no further focusing or defocusing elements are arranged between the astigmatic optics 7 and the illumination objective 4 and the position of the astigmatic optics 7 can be arbitrary along the optical axis. The astigmatic optics 7 is preferably arranged as close as possible to the objective 4. The cylinder lens has a concavely curved surface 12 and a planar surface 13.

The astigmatic optics 7 has a negative refractive power. Here, it can be provided in particular that the negative refractive power is $-1/(600\,mm)$, whereas the focal length of the illumination objective 4 is 40 mm.

Based on the light sheet plane, the optical system formed of the astigmatic optics 7 and the illumination objective 4 has a lower refractive power than the illumination objective 4 alone, and therefore the illumination light beam 8, once it has passed through the illumination objective 4, runs in a less divergent manner in relation to the light sheet plane (visible in particular in FIG. 1) than shown in the plane perpendicular to the light sheet plane (visible in particular in FIG. 2). As shown in FIG. 2, the astigmatic optics 7 can be positioned using a changing device 30, for example, a filter wheel, insert device or turret.

The illumination light beam 8, after having passed through the illumination objective 4, is astigmatic and thus has a first focus 9 in the plane perpendicular to the light sheet plane and has a second focus 10 in the light sheet plane, said first and second focus each having a different axial distance from the illumination objective 4. In the case of a negative refractive power of the cylinder lens 1, the first focus 9 is preferably used as a light sheet 11 so as to illuminate a sample in layers in an SPIM examination. The field of view 23 of a detection optics preferably lies within the light sheet 11. The two dashed lines shown in FIG. 2 to the left and right of the focal plane 26 of the illumination objective 4 indicate the depth of field of the light sheet.

FIG. 3 shows a second embodiment of an illumination arrangement according to the invention for a light sheet microscope in a view perpendicular to the light sheet plane, whereas FIG. 4 shows this embodiment in a view parallel to the light sheet plane.

In this embodiment as well, an astigmatic optics 7 is arranged between a tube lens 3 and an illumination objective 4, wherein no further focusing or defocusing elements are arranged between the astigmatic optics 7 and the illumination objective 4. However, the embodiment shown in FIGS. 3 and 4 differs from the embodiment shown in FIGS. 1 and 2 in that the astigmatic optics 7 has a positive refractive power. The astigmatic optics 7 contains a cylinder lens 1 having a convexly curved surface 14 and a planar surface 13.

The optical system formed of the astigmatic optics 7 and the illumination objective 4 has a greater refractive power in respect of the light sheet plane (FIG. 3) compared to the illumination objective 4 alone. The illumination light beam 8, which is astigmatic after having passed through the illumination objective 4, therefore has a first focus 9 relative to the light sheet plane (FIG. 3) and a second focus 10 relative to the plane perpendicular to the light sheet plane, wherein the first focus 9 is axially closer to the illumination objective 4 than the second focus 10. The second focus 10 is preferably used as a light sheet 11 in order to illuminate a sample in layers in an SPIM examination. Here, the fact is utilized advantageously that the second focus 10 has been produced exclusively by the refractive power of the illumination objective 4 and therefore all optical corrections of the illumination objective 4 are fully effective, whereas the first focus 9 is created by the joint effect of astigmatic optics 7 and illumination objective 4, such that the correction of aberrations is poorer for the first focus 9. In addition, this embodiment has the particular advantage that, due to the use of the second focus 10, more space is available for a detection objective that is to be arranged perpendicularly to the illumination objective 4. The field of view 23 of a detection optics preferably lies within the light sheet 11.

Figure 6:
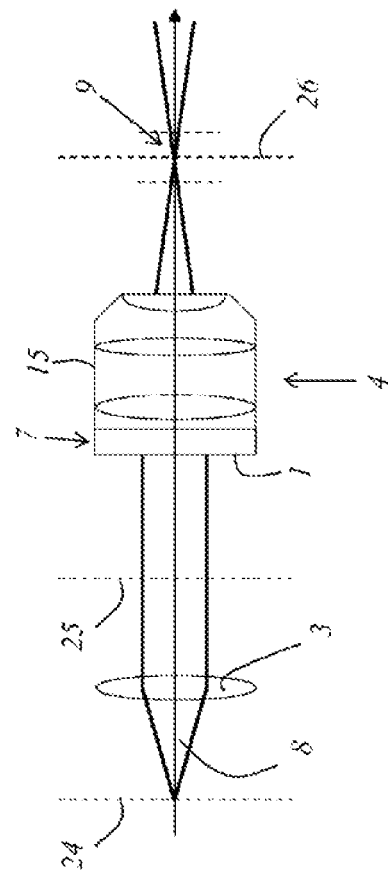
FIG. 6 shows the third embodiment in a view parallel to the light sheet plane.

FIGS. 5 and 6 show a third embodiment of an illumination arrangement according to the invention for an SPIM microscope, wherein FIG. 5 shows a view perpendicular to the light sheet plane (=drawing plane), whereas FIG. 6 shows a view from a direction parallel to the light sheet plane (the light sheet plane is perpendicular to the drawing plane).

The illumination arrangement contains an illumination objective 4 and a tube lens 3, as well as an astigmatic optics 7, which in this embodiment is in the form of a cylinder lens 1 having negative refractive power. This can be implemented for example in that the astigmatic optics 7 is formed as an attachment that can be screwed on in order to be secured to the illumination objective 4, in particular to an illumination objective housing 15 of the illumination objective 4. The astigmatic optics 7, however, can also be mounted in the illumination objective housing or can be securely mounted at a predefinable location on the illumination objective housing 15 or at any position within the illumination objective housing 15.

The illumination light beam 8 in this embodiment is focused substantially similarly to the manner in the embodiment shown in FIGS. 1 and 2. The field of view 23 of a detection optics preferably lies within the light sheet 11.

The illumination light beam 8 has a focus in a plane 24 conjugate with the focal plane 26 of the illumination objective 4 and is then collimated by a tube lens 3, such that it passes through the pupil plane of the illumination objective 4 in the form of a collimated illumination light beam.

With regard to the plane shown in FIG. 5, the astigmatic optics 7 does not change the refractive power of the illumination objective 4. The second focus 10 is therefore located in the focal plane 26 of the illumination objective 4. With regard to the plane shown in FIG. 6, the negative refractive power of the astigmatic optics 7 acts in addition to the refractive power of the illumination objective 4, and therefore the overall lower refractive power means that the second focus 10 lies further away from the illumination objective 4 than the first focus 9. Here, the fact is utilized advantageously that the first focus 9 has been produced exclusively by the refractive power of the illumination objective 4 and therefore all optical corrections of the illumination objective are fully effective, whereas the second focus 10 is created by the joint effect of astigmatic optics 7 and illumination objective 4, such that the correction of aberrations is poorer for the second focus 10.

Figure 7:
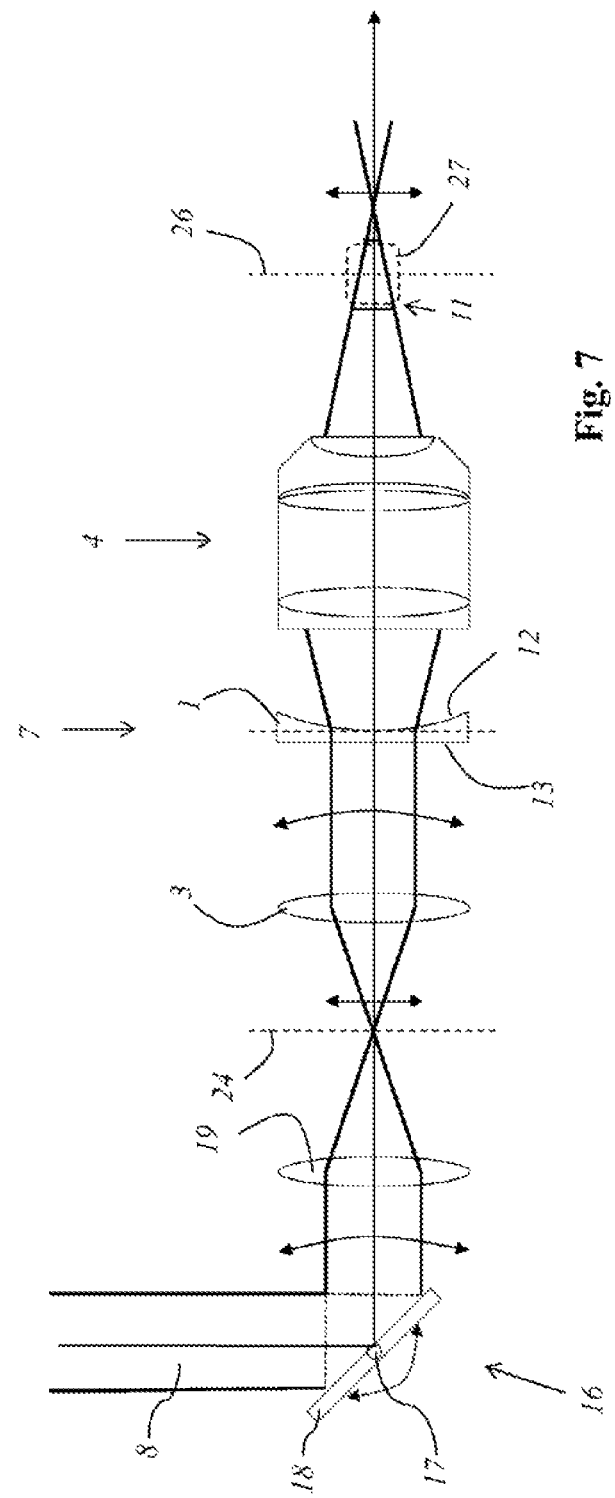
FIG. 7 shows a fourth embodiment of an illumination arrangement according to the invention in a view perpendicular to the light sheet plane.

FIG. 7 shows a fourth embodiment of an illumination arrangement according to the invention in a view perpendicular to the light sheet plane (light sheet plane=drawing plane), comprising a beam deflection device 16 (shown schematically) which can be adjusted in respect of the deflection angle, specifically a mirror 18 rotatable about a rotation axis 17. The rotation axis 17 is oriented perpendicularly to the light sheet plane.

A scanning lens 19 is arranged downstream of the mirror 18. In addition, the illumination arrangement comprises an illumination objective 4, a tube lens 3, and an astigmatic optics 7, which contains a cylinder lens 1. The astigmatic optics 7 is arranged between the tube lens 3 and the illumination objective 4, wherein no further focusing or defocusing elements are arranged between the astigmatic optics 7 and the illumination objective 4. The cylinder lens has a concavely curved surface 12 and a planar surface 13. The illumination light beam 8 in this embodiment is focused by the illumination objective 4 substantially similarly to the manner in the embodiment shown in FIGS. 1 and 2.

By rotating the mirror 18 about the rotation axis 17, the focus produced by the scanning lens 19 can be moved in the plane 24 conjugate with the focal plane 26 of the illumination objective 4, transversely to the optical axis (see double-headed arrow), whereby the light sheet can be displaced perpendicularly to the optical axis of the illumination objective 4, for example so as to illuminate a sample area 27 successively by means of the light sheet 11 over the width of the field of view. A sample area 27—possibly even larger than that shown in FIGS. 7 and 8—can thus be illuminated in a scanning manner time-sequentially. It is also possible to shift the light sheet in the light propagation direction when a sample layer is to be illuminated in two dimensions successively by means of the light sheet 11.

Figure 8:
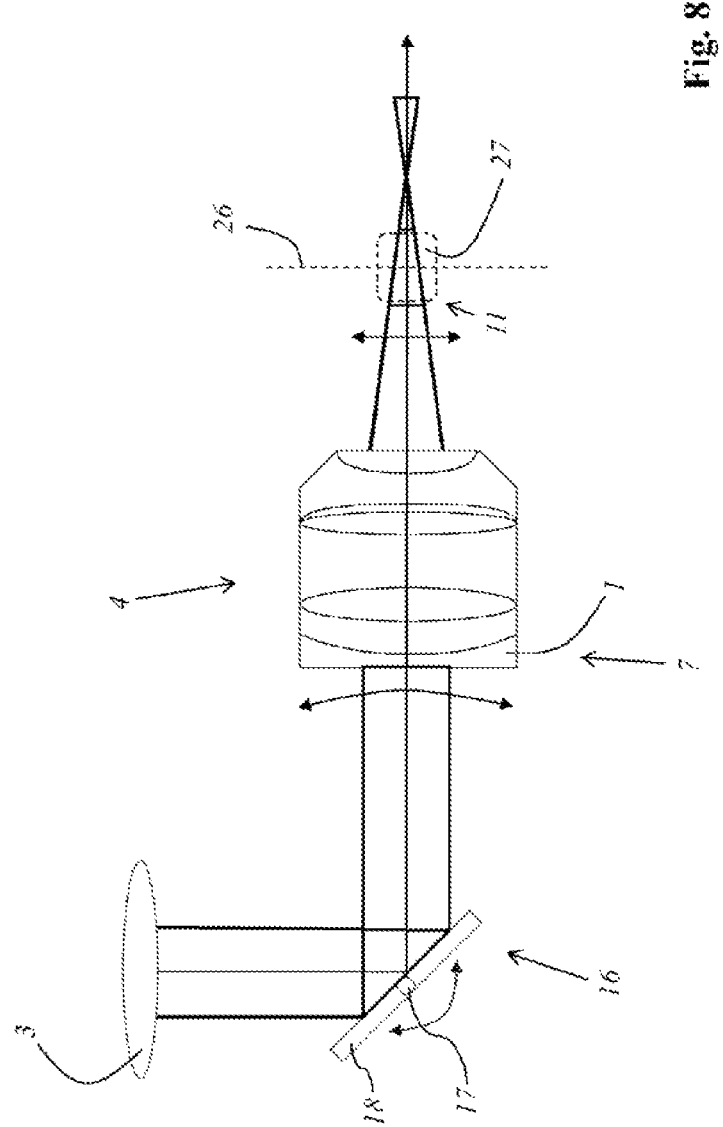
FIG. 8 shows a fifth embodiment of an illumination arrangement according to the invention in a view perpendicular to the light sheet plane.

FIG. 8 shows a fifth embodiment of an illumination arrangement according to the invention in a view perpendicular to the light sheet plane (light sheet plane=drawing plane). The illumination arrangement contains an illumination objective 4 and a tube lens 3, and an astigmatic optics 7, which, as a cylinder lens 1 having negative refractive power, is part of the illumination objective 4.

The illumination arrangement additionally contains, between the tube lens 3 and the illumination objective 4, a beam deflection device 16 (shown schematically), which is adjustable in respect of the deflection angle and which makes it possible to shift the light sheet 11, which illuminates a sample area 27, perpendicularly to the optical axis of the illumination objective 4.

FIGS. 9 to 11 show an embodiment of an illumination objective 4 according to the invention and arrangement thereof relative to a detection objective 20 compared to an arrangement with a conventional illumination objective 4, wherein in each case the arrangement according to the prior art is shown in the left-hand image and the arrangement comprising the illumination objective 4 according to the invention is shown in the right-hand image. The free working distance X, that is to say the distance between the focal plane 26 and front lens of the illumination objective 4, in accordance with the invention can be reduced significantly compared to the free working distance of the arrangements known from the prior art.

The illumination objective 4 according to the invention tapers from an entry aperture 28, which is circular in cross section perpendicular to the optical axis, towards a front lens 21, which is elliptical in cross section perpendicular to the optical axis, wherein the illumination objective 4 is preferably oriented in such a way that the vertical axis of the elliptical front lens 21 is arranged in the plane of the light sheet 11. The specific form of the illumination objective 4 makes it possible to use the illumination objective 4 in combination with a detection objective 20 that has a front lens 22 with a high numerical aperture even if the illumination objective 4 has a short working distance, in particular a working distance that is smaller than the radius of the detection objective 21, in particular a working distance that is only slightly greater than the field of view of the detection objective 21.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1 cylinder lens
2 relay lens
3 tube lens
4 illumination objective
5 plane conjugate with the pupil of the illumination objective
6 light beam
7 astigmatic optics
8 illumination light beam
9 first focus
10 second focus
11 light sheet
12 concavely curved surface
13 planar surface
14 convexly curved surface
15 illumination objective housing
16 beam deflection device
17 rotation axis
18 mirror
19 scanning lens
20 detection objective
21 elliptical front lens of (4)
22 front lens of the detection objective
23 field of view of the detection optics
24 plane conjugate with (26) of (4)
25 pupil plane of (4)
26 focal plane of (4)
27 sample area
28 entry opening of (4)
X free working distance of (4)

The invention claimed is:

1. An illumination arrangement for a light sheet microscope, in which a sample is illuminated using an illumination light beam that is formed as a light sheet in a region of the sample, the illumination arrangement comprising:
   an illumination objective;
   a tube lens; and
   astigmatic optics designed in such a way and arranged between the tube lens and the illumination objective in such a way that the illumination light beam exiting from the illumination objective is focused both in a sagittal plane and in a meridional plane.

2. The illumination arrangement according to claim 1, wherein a focal length of the astigmatic optics is different compared to a distance of the astigmatic optics from a pupil of the illumination objective.

3. The illumination arrangement according to claim 1, wherein no further focusing or defocusing elements are arranged between the astigmatic optics and the illumination objective, and/or wherein the astigmatic optics is arranged rotatably about an axis, at least through a predefinable angular range.

4. The illumination arrangement according to claim 1, wherein the astigmatic optics is part of the illumination objective.

5. The illumination arrangement according to claim 1, wherein:
   a. the astigmatic optics has a negative refractive power,
   b. the astigmatic optics has a refractive power in a range of from $-1/(500\text{ mm})$ to $-1/(700\text{ mm})$,
   c. the astigmatic optics has a refractive power that is less than $1/10$ of a refractive power of the illumination objective,
   d. the astigmatic optics has a negative refractive power at least in respect of the sagittal plane, and/or
   e. the astigmatic optics has a negative refractive power at least in respect of the meridional plane.

6. The illumination arrangement according to claim 1, wherein:
   a. the astigmatic optics has a positive refractive power,
   b. the astigmatic optics has a positive refractive power at least in respect of the sagittal plane, and/or
   c. the astigmatic optics has a positive refractive power at least in respect of the meridional plane.

7. The illumination arrangement according to claim 1, wherein:
   a. the astigmatic optics is formed as a cylinder lens or comprises a cylinder lens,
   b. the astigmatic optics is formed as a cylinder lens having at least one concavely curved surface or comprises a cylinder lens having at least one concavely curved surface, or
   c. the astigmatic optics is formed as a cylinder lens having at least one convexly curved surface or comprises a cylinder lens having at least one convexly curved surface.

8. The illumination arrangement according to claim 1, wherein:
   a. the astigmatic optics is arranged in a pupil of the illumination objective, and/or
   b. the astigmatic optics is arranged in an infinite beam path between the tube lens and the illumination objective.

9. The illumination arrangement according to claim 1, wherein:
   a. the illumination objective tapers from an entry aperture, which is circular in cross section perpendicular to the optical axis, towards a front lens, which is elliptical in cross section perpendicular to the optical axis, and/or in that
   b. the illumination objective tapers from an entry aperture, which is circular in cross section perpendicular to the optical axis, towards a front lens, which is elliptical in cross section perpendicular to the optical axis, wherein the vertical axis of the front lens is arranged in the plane of the light sheet.

10. The illumination arrangement according to claim 9, wherein part of the illumination objective is rotatable relative to the rest of the illumination objective, at least through a predefinable angular range, and wherein the rotatable part of the illumination objective comprises the elliptical front lens.

11. The illumination arrangement according to claim 1, wherein a position and/or an orientation of the astigmatic optics is adjustable.

12. The illumination arrangement according to claim 1, further comprising a rotatable mirror or a beam deflector configured to change a position of the light sheet perpendicularly to an optical axis of the illumination objective.

13. The illumination arrangement according to claim 1, wherein the astigmatic optics is formed as an attachment to be secured to the illumination objective or an illumination objective housing.

14. A microscope containing an illumination arrangement according to claim 1.

15. The microscope according to claim 14, wherein the astigmatic optics is selectively insertable into the beam path of the illumination light beam or removable from the beam path of the illumination light beam by a changing device configured to introduce optical components into the beam path of the illumination light beam.

16. The microscope according to claim 15, wherein the changing device is formed as a filter wheel, a filter insert device, a turret or DIC turret.

17. The microscope according to claim 14, wherein the microscope is a scanning microscope.

18. The illumination arrangement according to claim 1, wherein the illumination objective contains the astigmatic optics configured to produce the light sheet for single plane illumination microscopy (SPIM) examination of a sample, and/or wherein the illumination objective tapers from an entry aperture, which is circular in cross section perpendicular to an optical axis, towards a front lens, which is elliptical in cross section perpendicular to the optical axis.

19. A method for illuminating a sample by an illumination arrangement according to claim 1, the method comprising:
    using the astigmatic optics such that the illumination light beam focused by the illumination objective has a sagittal and a meridional focus, which each have a different axial distance from the illumination objective, wherein:
    a. the sample is positioned in a region of the focus having a shorter axial distance from the illumination objective based on the astigmatic optics having a negative refractive power, or
    b. the sample is positioned in a region of the focus having a greater axial distance from the illumination objective based on the astigmatic optics having a positive refractive power.

20. The illumination arrangement according to claim 1, wherein the position of the light sheet is adjustable along a light propagation direction.

21. A method for illuminating a microscopic sample using a light sheet, the method comprising:
    focusing an illumination light beam by an illumination objective; and
    using astigmatic optics that are arranged between a tube lens and the illumination objective in such a way that the illumination light beam focused by the illumination objective has a sagittal and a meridional focus, which each have a different axial distance from the illumination objective.

22. The method according to claim 21, wherein:
    a. the sample is positioned in a region of the focus having a shorter axial distance from the illumination objective based on the astigmatic optics having a negative refractive power, or
    b. the sample is positioned in a region of the focus having a greater axial distance from the illumination objective based on the astigmatic optics having a positive refractive power.

* * * * *